(12) United States Patent
Picon et al.

(10) Patent No.: US 7,516,420 B2
(45) Date of Patent: Apr. 7, 2009

(54) METHOD AND SYSTEM FOR EXTENDING THE FILE SYSTEM API

(75) Inventors: Joaquin Picon, St. Laurent du Var (FR); Pierre Secondo, Tourrettes sur Loup (FR); Gerard Marmigere, Drap (FR)

(73) Assignee: International Business Machines Corporation, Armonk, NY (US)

(*) Notice: Subject to any disclaimer, the term of this patent is extended or adjusted under 35 U.S.C. 154(b) by 235 days.

(21) Appl. No.: 10/520,797

(22) PCT Filed: Jun. 13, 2003

(86) PCT No.: PCT/EP03/07132

§ 371 (c)(1),
(2), (4) Date: Feb. 23, 2006

(87) PCT Pub. No.: WO2004/008310

PCT Pub. Date: Jan. 22, 2004

(65) Prior Publication Data

US 2006/0206511 A1 Sep. 14, 2006

(30) Foreign Application Priority Data

Jul. 11, 2002 (EP) .................................. 02368078

(51) Int. Cl.
*G06F 3/048* (2006.01)
(52) U.S. Cl. ........................ 715/847; 715/853
(58) Field of Classification Search .................. 707/102; 715/853, 751, 847
See application file for complete search history.

(56) References Cited

U.S. PATENT DOCUMENTS

| | | | | |
|---|---|---|---|---|
| 5,544,360 A | * | 8/1996 | Lewak et al. ................. 707/1 |
| 5,574,898 A | * | 11/1996 | Leblang et al. ................ 707/1 |
| 5,694,563 A | * | 12/1997 | Belfiore et al. .............. 715/821 |
| 5,724,578 A | * | 3/1998 | Morinaga et al. ........... 707/100 |
| 5,832,527 A | * | 11/1998 | Kawaguchi ................. 707/205 |

(Continued)

FOREIGN PATENT DOCUMENTS

WO  WO 00/51021  8/2000

OTHER PUBLICATIONS

FreeBSD HyperText Man Pages, "In, link—make links" 1993, Provided with IDS.*

(Continued)

*Primary Examiner*—William L Bashore
*Assistant Examiner*—Ashraf Zahr
(74) *Attorney, Agent, or Firm*—Norman L. Gundel; Hoffman Warnick LLC

(57) ABSTRACT

A method is disclosed to create files in a file system hierarchy in a way which facilitates their retrieval. The method comprises the steps of: entering a command from an application to create a file; displaying the file hierarchy; allowing a user to select at least one folder; saving data in a first file having a file name in one selected folder; in each of the other selected folders, creating a shortcut file having the same file name and containing a pointer to the first file; and creating a hidden file in the folder containing the first file, the hidden file containing a list of pointers to the shortcut files.

5 Claims, 6 Drawing Sheets

U.S. PATENT DOCUMENTS

| | | | | |
|---|---|---|---|---|
| 5,897,638 | A * | 4/1999 | Lasser et al. | 707/102 |
| 5,956,036 | A * | 9/1999 | Glaser et al. | 715/853 |
| 6,195,650 | B1 * | 2/2001 | Gaither et al. | 707/1 |
| 6,321,219 | B1 * | 11/2001 | Gainer et al. | 707/3 |
| 6,405,309 | B1 * | 6/2002 | Cheng et al. | 713/1 |
| 6,477,544 | B1 * | 11/2002 | Bolosky et al. | 707/200 |
| 6,636,250 | B1 * | 10/2003 | Gasser | 715/853 |
| 6,854,089 | B1 * | 2/2005 | Santee et al. | 715/783 |
| 6,910,193 | B1 * | 6/2005 | McBride | 716/4 |
| 6,970,888 | B1 * | 11/2005 | Sciarra | 707/200 |
| 7,032,186 | B1 * | 4/2006 | Gasser et al. | 715/853 |
| 2001/0014892 | A1 * | 8/2001 | Gaither et al. | 707/200 |
| 2003/0184600 | A1 * | 10/2003 | Lin-Hendel | 345/853 |

OTHER PUBLICATIONS

FP98: How to submit form reslts to multiple files, people, Dec. 1, 2000, Microsoft, http://support.microsoft.com/kb/187249/.*

FreeBSD Hypertext Man Pages, "In, link—make links", Dec. 30, 1993, pp. 1-2, http://www.freebsd.org/cgi/man.cgi?query=In&apropos=0&sektion=0&manpath=freebsd.

Information Materials for IDS, Date of KIPO Action Nov. 9, 2006, pp. 1-2.

FreeBSD Hypertext Man Pages, "In, link—make links", 1993, http://www.freebsd.org/cgi/man.cgi?query=in&apropos=0&sektion=0&manpath=FreeBSD+5.2.1-RELEASE+and+Ports&format=html.

* cited by examiner

METHOD AND SYSTEM FOR EXTENDING THE FILE SYSTEM API

FIELD OF THE INVENTION

The present invention generally relates to file systems; more particularly, this invention concerns a new function of the file system which facilitates the retrieval of files.

BACKGROUND OF THE INVENTION

Every operating system includes a file system to manage data files. An API is provided by the operating system to develop applications providing an interface to the user to manage his own files. A typical application is a file manager to create, move, copy, delete, and rename files interactively through a user friendly graphical interface. Other applications such as text or graphical editors also use the API of the operating system to allow the user to manipulate the data he has processed.

The file system assigns to the users a hierarchical organization of their files. In such a tree data structure, the nodes are folders having branches with other folders, the leaves being the files. Each node and file is identified by a name which is a character string having a limited size and that the user is free to assign. The file or folder path is the list of the node names of the system file hierarchy to reach it, the last name being the file or folder name. With the applications using the file system API, the user can first visualize a hierarchical representation of his files. The graphical view is a tree in which the nodes are identified by the folder and file names. The user selects one folder or file by clicking on the name. The structure depending on one node can be either expanded or collapsed.

The applications using the file system API such as the file manager allow the user to create a file. At the file creation, the file manager requests the user to give a name. This name is unique for each file. To retrieve an existing file, the user can navigate, through the graphical representation of the file system hierarchy and select it by clicking on the corresponding node. Retrieving a file knowing its name is immediate. To retrieve a file without knowing its name requires knowledge of its path or at least the name of nodes belonging to its path to find it quickly in the file system hierarchy.

Usually, when a file is created, the user faces different possibilities to choose the node in the hierarchy where the file is to be stored. Most of the time, the file has a relationship with its content, the recipient, the product described in the file, and multiple other possibilities. At creation time, the recipient information may appear to be the most relevant information and the user chooses to store it in the file hierarchy containing everything related to recipients (customers for example). Unfortunately, today, one path must be selected and only one. At retrieval time, which may be months later, the relationship the user remembers might not be the recipient but instead the product described and therefore the user will start looking for the file in the hierarchy under products without a chance to find it.

Today, file managers reference a file by its unique combination of path and file name. With the U.S. patent Of Sun Microsystems, Inc., U.S. Pat. No. 6,055,540, a method is disclosed to create a class hierarchy. The patent proposes a document classification on top of the usual tree data structure built in the file managers, to perform a more efficient retrieval of documents. With the embodiment described, the user can create a class hierarchy by defining a tree structure of category nodes, the leaves and a category definition. The method provides also an interface to update the category node structure or definition. The solution of the prior art is helpful to be mapped on an application database such as a software engineering database used by application developers. It is used, for instance, to organize the access to data between developers as the categories of data are created in relation with development. This solution of the prior art requires time and process resources to manage the category nodes. It is used for coordinating a group of users and to organize the data as they are created and updated by this group of users.

The standalone user of a computer managing his own file system does not want to create and manipulate a new data structure over the standard tree data structure proposed by the file manager of the operating system. Neither does the user want to store the files according to a list of categories that need to be shared by a group and need to be managed as with the solution of the prior art.

SUMMARY OF THE INVENTION

It is therefore an object of the present invention to provide a method to retrieve a file in the standard tree data structure of the file system.

The second object is to achieve the first object by a simple manipulation through a graphical user interface.

These objects are reached by a method for managing data using a file name on a computer system having a graphical user interface and a file system storing files with a file hierarchy, the method comprising the steps of:

entering a command from an application to create a file;
  displaying the file hierarchy;
  allowing a user to select at least one folder;
  saving data in a first file having a file name in one selected folder;
  in each of the other selected folders, creating a shortcut file having the same file name and containing a pointer to the first file;
  creating a hidden file in the folder containing the first file, the hidden file containing a list of pointers to the shortcut files;
  using the hidden file during file management operations to keep track of occurrences of the shortcut files in the file hierarchy.

The method also comprises steps for opening, deleting, moving, and copying a file created as defined above. To keep the integrity of the file system, all these file management operations are executed while updating the hidden file which always keeps track of the occurrences of the file in the file system.

The objects of the invention are also achieved with the use of a program comprising instruction adapted to implement the steps of the method claims when they are executed on a computer.

The objects of the invention are also achieved by a computing system comprising means to execute the program. It is noted that the file management functions, particularly the multipleStore function, can be integrated in the file system and provided to a computing system user as an extension of the API of the operating system.

One advantage of the invention is the use of a virtual link to a real file also called the "shortcut," "alias," or LINK according to the operating system. This function is available with most of the operating system APIs. This function will be generically called shortcut hereafter in the document.

DETAILED DESCRIPTION OF THE INVENTION

Figure 1:
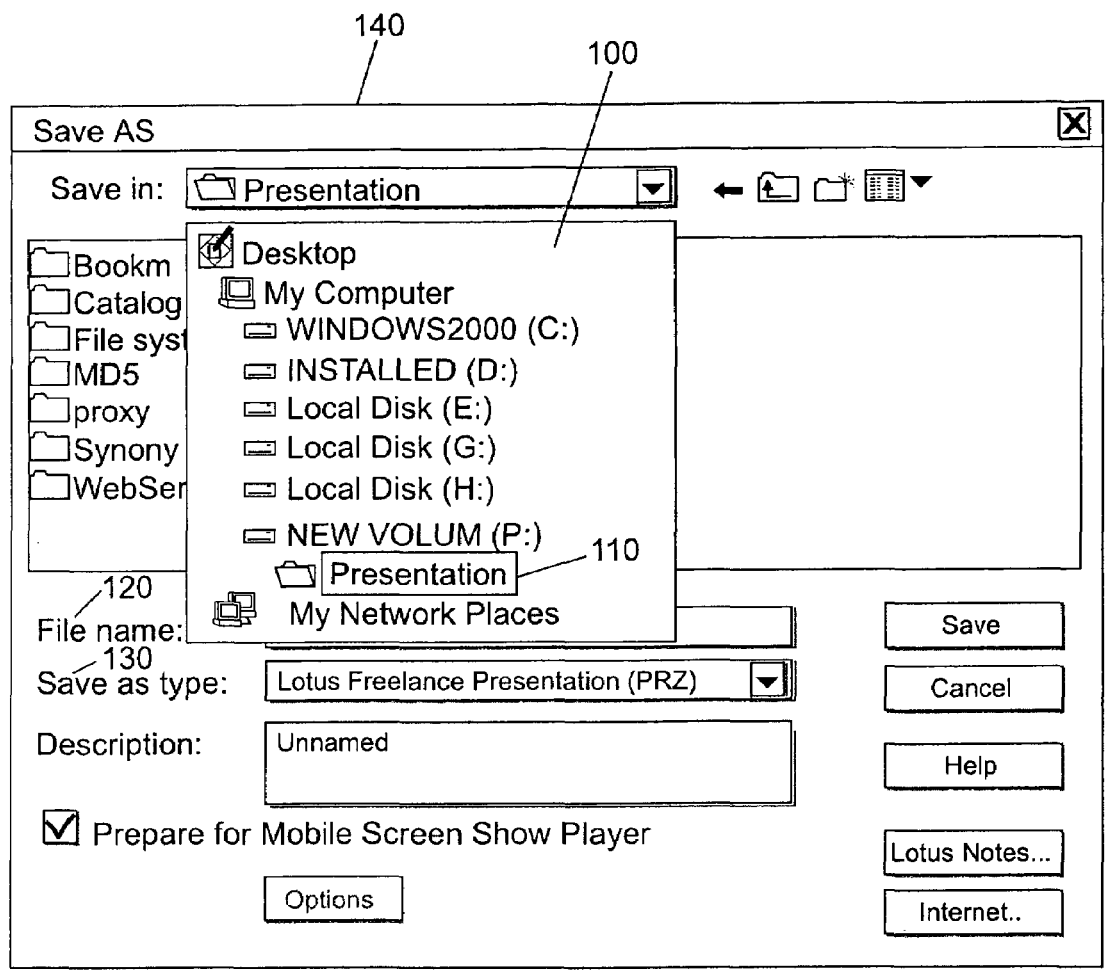
FIG. 1 illustrates a graphical interface of a file manager of the prior art displaying a file system hierarchy of a user during a file creation operation.

FIG. 1 is a screen view of the graphical interface of a file creation operation performed by the graphical editor Freelance Graphics from the IBM Lotus Smart Suite. By selecting the "Save" command in a menu of actions, a save window (140) is displayed by the application and the user is requested to save the data he has edited under a file name. By clicking on a specific icon, the user displays his file system hierarchy. The application opens a second window (100) with the tree representation of the file hierarchy. The user clicks on the folder, here "Presentation" (110), of the file system hierarchy in which he wants to save the created file. The user is required to enter the file name (120) and the file type (130).

The user may want to retrieve later his file during the execution of an application using the API of the operating system. Using the same example of the Freelance Graphics graphical editor, the user selects the "Open" command of the menu of actions. An open window is opened by the application and once again the user will click on the specific icon to request his file system hierarchy to be displayed. The user has to remember the path and the name of the folder "Presentation" to navigate in the hierarchy. If the user does not remember the name of the folder, he will have to navigate in the file system tree and to open folders. Finally, by clicking on the folder "Presentation" the user will display the content and will retrieve his file.

Figure 2:
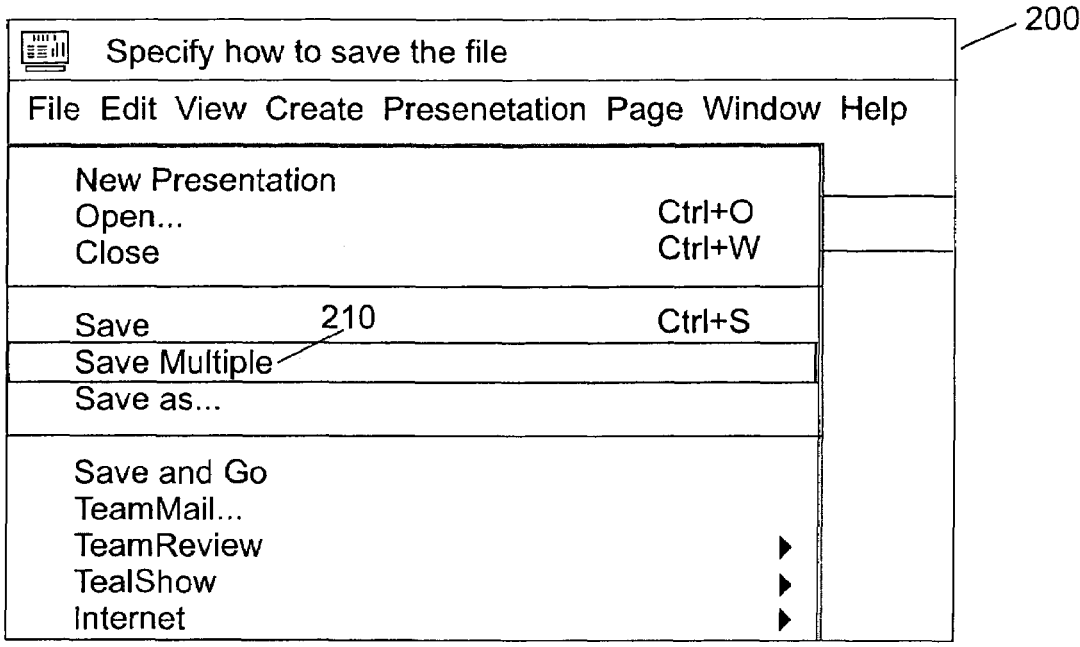
FIG. 2 illustrates a user interface file creation operation displaying the "Save Multiple" command according to a preferred embodiment of the present invention.
Figure 3:
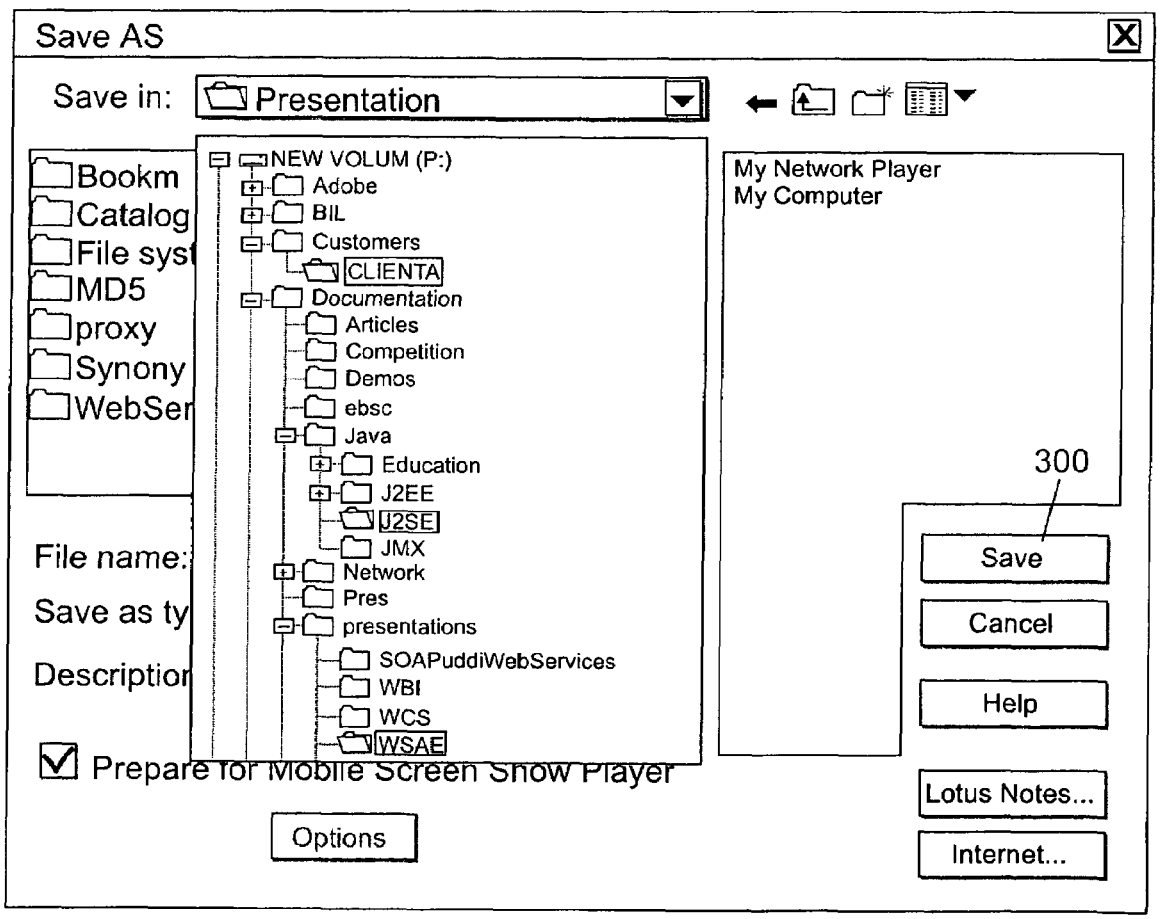
FIG. 3 illustrates the user interface file creation operation displaying the file hierarchy while using the "save Multiple" command according to the preferred embodiment of the present invention.

FIG. 2 illustrates a graphical interface to create a file using the method of the preferred embodiment of the present invention. As with the prior art, the operation of creating a file is started from any application such as the Freelance Graphics graphical editor. Contrary to the prior art, however, in the menu of possible actions, the user can choose between "Save as" (200) and "Save Multiple" (210) actions to create a file. When "Save Multiple" is chosen, the file hierarchy of the file system is displayed as described in FIG. 3. From the graphical representation, the user may select multiple folders according to the relationship he has in mind concerning the data he wants to save in a file. For example, a customer, a product, and a technology folder. In the screen view of FIG. 3, for example, three folders have been chosen for the file, the first one being CLIENTA, which is the name of a customer for whom the graphical presentation has been created. The "Save Multiple" operation allows the user to click on a second folder, J2SE, because the presentation is related to SUN Java (Java is a trademark of SUN Microsystems) technology. In addition, as the presentation uses the IBM product Websphere, the folder "Websphere" is also selected. Once the multiple selection is done, the user clicks in the window of the Save button (300) and the application, instead of calling the usual operating system API, invokes a new function (multipleStore (fileName, path1, path2, path3)) which will be described in reference with the flowchart of FIG. 4.

Later on, to retrieve that file from an application such as Freelance Graphics graphical editor, the user will select the "Open" command in the menu of the possible actions, as with the method of the prior art. The application displays the file hierarchy of the user file system. If the user does not remember the folder in which the file has been saved, he has to navigate in the displayed tree. Now, in accordance with the present invention, as the user has created a file under more than one folder, the user has multiplied his chances to remember one of the paths he selected during the creation which had a relationship with the file content. The user has in mind, for example, to save a presentation prepared for a customer, three relationships:

1. Customer=CLIENTA
2. Technology=J2SE
3. Product=Websphere

The user selects one of the folders and the files contained in the folder are displayed.

Figure 4:
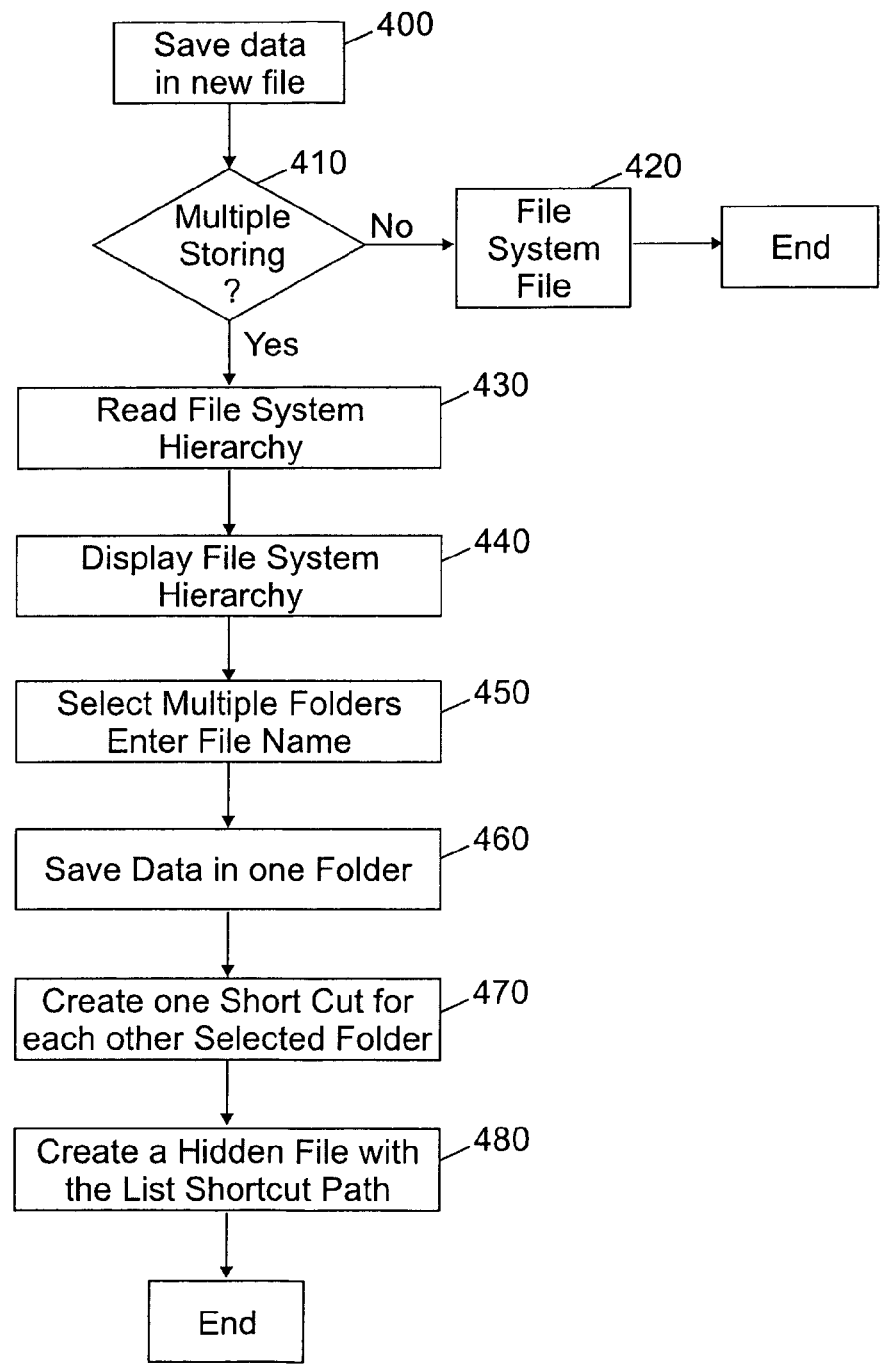
FIG. 4 is a flow chart of the method of file creation according to the preferred embodiment of the present invention.

FIG. 4 is a flow chart describing the steps of the method of the preferred embodiment of the present invention to create a new file using the "Save Multiple" operation. In the first step, the user chooses from a menu of possible actions to save data in a new file (400). A window is displayed in which the user enters the file name. If the user does not choose the "Save Multiple" (answer No to test 410), the "Save as" option will be used. This standard option being performed by the application using the usual System file API of the operating system. If the user chooses to perform a "Save Multiple" (answer yes to test 410), the application reads the file system hierarchy of the user (430) and displays the graphical tree structure representation (440). The user selects at least one folder (450) in which to save the file. The user may decide to create folders first if they do not exist. The user is entirely free on his selection of folders. Assuming the user selects more than one folder, by this choice, the user defines different paths, for instance path1, path2 and path3, for his new file (assuming three folders have been selected). When the folders are defined, the user clicks on the "save" button to create the file. The application activates a function (multipleStore (fileName, path1, path2, path3)) which could be integrated as an API of the operating system. The four parameters provided by the application are the inputs entered by the user; they include the name of the file and the three paths. The path parameters are coded according to the operating system, usually as a list of node name with a separator between two items. The multipleStore function reads the first path, path1, and stores the data (460) in a file defined by the fileName and path1, the first path of the parameter list. It is noted that in any other embodiment any of the other folders can be chosen to store the data. Then a shortcut to this first file is created (470) for each of the other paths. In the example two shortcuts to the first file are created, one in the file defined by the fileName and path2, the second in the file defined by the fileName and path3. The shortcut function is part of most operating systems. It is also called alias or LINK according to the operating system. A shortcut file contains a pointer to one other file. When the user selects a shortcut icon or label on the screen, the system selects the file corresponding to the pointer stored in the shortcut file. One application using the shortcut function is the desktop manager which allows the customer to create shortcut icons of the programs he wants to start execution directly by clicking on the icons from his desktop. The functions supported by the system is the display of a shortcut content (display of the name of the file the shortcut is pointing to), creation, deletion, open and close of a shortcut file. Opening or closing a shortcut file has the effect of opening or closing the real file to which the shortcut file points. The shortcut files created in the preferred embodiment are path2/fileName and path3/fileName. In a last step, the function creates a file called shortcutFile (480) at the same location as the file containing the data (path1/fileName in our example). This file is used later during the other file management operation. The function gives to the file system the "hidden" attributes for the shortcut file; consequently, this file will be hidden when the user displays the tree representation of his user file system. The shortcutFile contains the list of the shortcut files created for this file. In the example the list comprises path2/fileName and path3/fileName.

The retrieval of the file is not part of the invention as being performed by the application using the standard operating system API. When the user of an editor application selects the command "open" in the menu of possible actions, the file system tree representation is displayed. If the user does not remember the name of the file he navigates in the file system tree until he encounters a folder name reminding him of a relationship with the file content. To retrieve the file the user can select any one of the three folders designated during the "Save Multiple" operation and retrieve the file inside the folder by clicking on the file name inside the selected folder. If the user selects the file physically containing the data (path1/fileName in the illustrative example), the operating system API is used to open this file. If the user selects a shortcut file (path2/fileName or path3/fileName) the shortcut function, which is part of the operating system API, is used to open the real file (path1/fileName).

One variation to this preferred embodiment is, at creation of the file with the "Save Multiple" command, to give the user the possibility of assigning a different file name in each different folder. In the example above, the multipleStore function could be:

(multipleStore(fileName1,path1,fileName2,path2,fileName3, path3)).

This second embodiment provides greater flexibility for file naming. The move command which is described later in the document in the case of the preferred embodiment, will be easily adapted by the person skilled in the art to this second embodiment which allows different file names. As a matter of fact, if the user wants to move a file created by the "Save Multiple" command to a different folder, the application asks the user if he wants to keep the same file name or not.

The method of the preferred embodiment of the present invention could also apply to save a file which has already been created using a "Save Multiple" command. Assuming that a user has modified such a file, if he activates the "save" command in the menu of the possible actions, the new version of the file is saved in the real file, even if the user has opened a shortcut of the file. The standard shortcut API is used. If the user activates the "Save Multiple" command the shortcutFile is read and the tree file system representation is displayed highlighting the folder of the file and the folders of the shortcut files. The user can validate the save as it is by clicking on the save button; he can also de-select or select other folders by clicking on the corresponding tree nodes before clicking on the save button. Correspondingly, new shortcut files are created, other ones are deleted using the shortcut standard API and at the hidden shortcutFile is updated.

Figure 5:
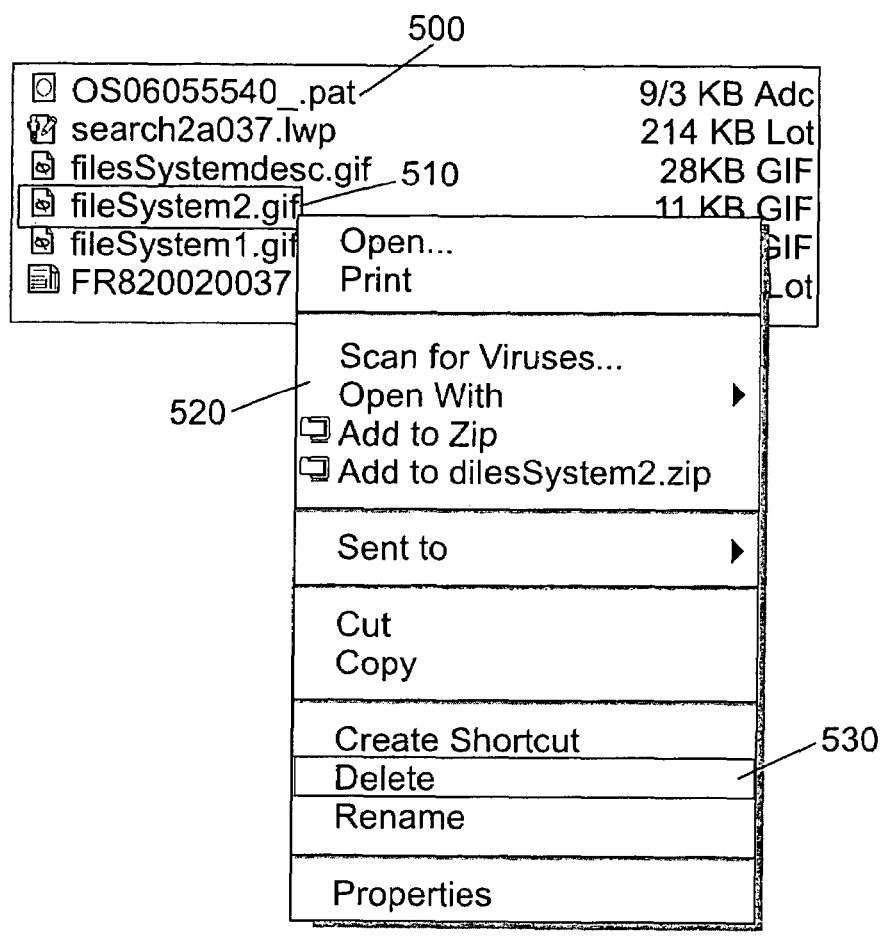
FIG. 5 illustrates a user interface file delete operation according to the preferred embodiment of the present invention.

The screen view of FIG. 5 illustrates the user interface of the method of the preferred embodiment to delete a file created using the "Save multiple" command. In the file tree graphical representation (500) displayed by a file manager application, the user selects the file he wants to delete, here "filesystem2.gif" (510). In the menu of possible actions (520), the user selects the delete function (530).

Figure 6:
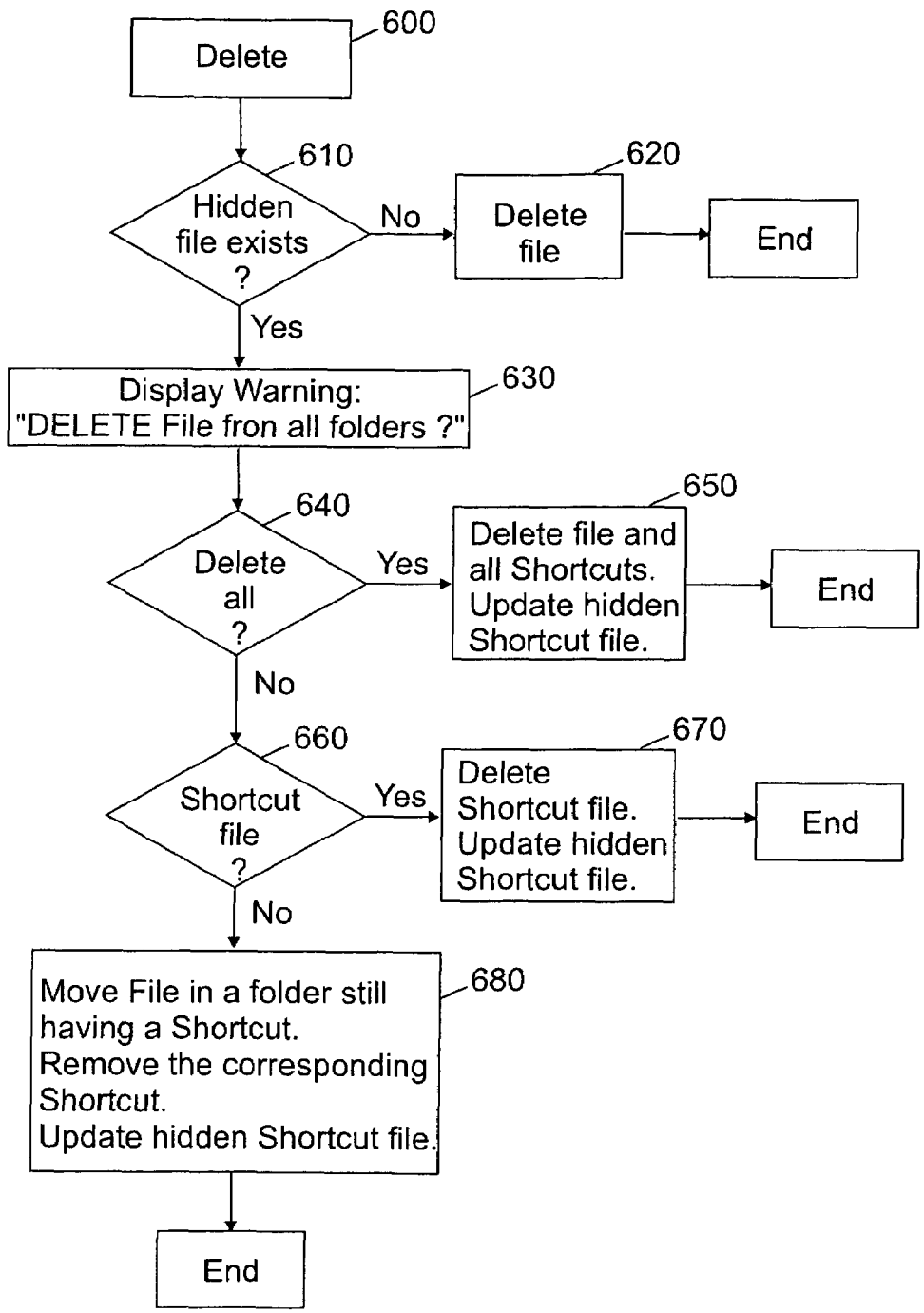
FIG. 6 is a flow chart of the file delete operation according to the preferred embodiment of the present invention.

FIG. 6 shows the flowchart of the method to delete a file. The delete operation is managed with caution to keep the integrity of the system. Assuming with the same illustrative example of FIG. 4 that the user data has been physically saved in a first file (path1/fileName) and that two shortcuts (path2/fileName and path3/fileName) of this first file have been created in two other folders. These shortcuts are also saved in the shortcutFile file.

The user has first selected a folder in the file hierarchy which has been displayed by the application and has selected in the folder the file corresponding to the fileName. Then he has activated the "delete" command (600) in the menu of the possible actions. The file may have been created using the multipleStore function. A test is performed to check if a hidden file exists in the folder of the first file containing the data. If no hidden file exists (answer No to test 610) the file is deleted (620). If a hidden file exists (answer Yes to test 610), the user is prompted with a warning message such as "Delete file from all folders?" (630). The user may decide to remove all the occurrences of the file, the first file, the shortcut files and the hidden shortcutFile (answer Yes to test 640). The sequence of operation is, first read the shortcutFile and remove all listed shortcuts from the corresponding folders and delete them. Lastly, the original file and the hidden shortcutFile are deleted. If the user wants to delete only the occurrence of the file under the folder he has selected, (answer No to test 640) two cases are possible. If the file selected under the fileName is a shortcut file, (answer Yes to test 660), the shortcut file is deleted and this shortcut file address is removed from the hidden shortcutFile (670). If the file selected under the fileName is not a shortcut file (answer No to test 660) but is the first file. This file is moved in a second folder having a shortcut. The corresponding shortcut is removed, the hidden shortcutFile is updated and moved to the second folder (680). In the illustrative example, shortcut pointing to the path2 folder is removed and shortcut to folder path3 is kept.

It is noted that the function of deleting all the occurrences of a file may be optional and that, consequently the warning message "delete file from all folders" is optionally displayed to the user.

Other operations of a file manager such as "copy file" or "move file" are also modified by the method of the preferred embodiment when it applies to file created with the "Save Multiple" function. The man skilled in the art can adapt the current commands of the preferred embodiment using the operating system API by adding at the end of the command execution the corresponding update of the shortcutFile.

Figure 7:
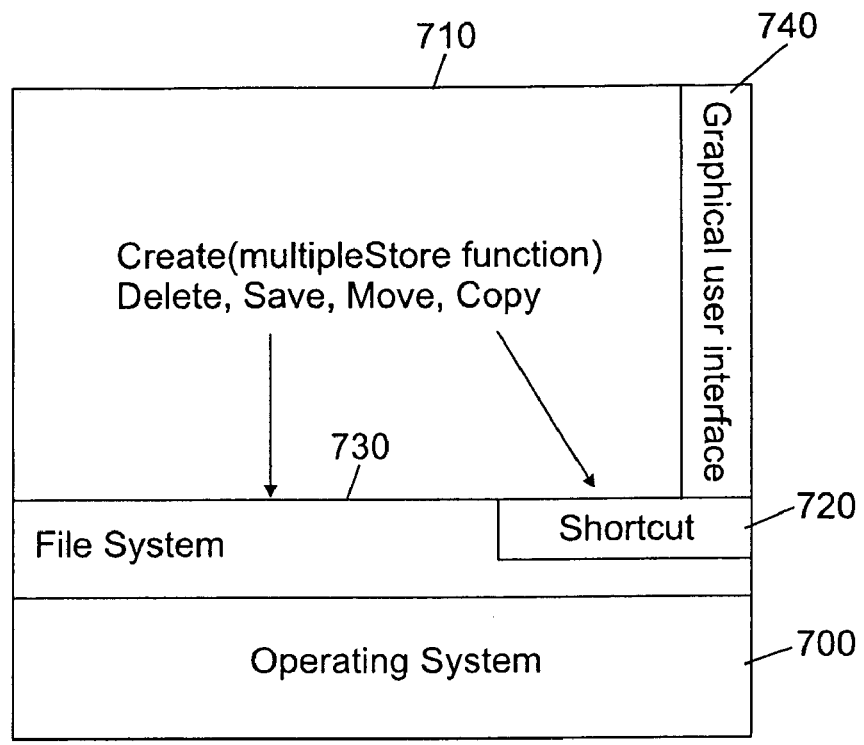
FIG. 7 is a logical view of the software layers, in a computer, of the software environment of an application implementing the method of the preferred embodiment of the present invention.

FIG. 7 illustrates different software layers in the storage of a computing system operating the method of the preferred embodiment. In the preferred embodiment, the method is implemented as an application (710) providing the functions described in the document: create file, save, copy, move, delete. The application uses the API of the File system (730), which is a part of the API of the operating system (700). In the file system API, more particularly, the application uses the shortcut API (720). The application uses the graphical user interface (740) provided with the operating system to interface the user. It is noted that the multipleStore function can be implemented as an extension to the system file API.

The invention claimed is:

1. A method for managing data using a file name on a computer system having a graphical user interface and a file system storing files with a file hierarchy, the method comprising the steps of: entering a command from an application to create a file;
   - displaying the file hierarchy;
   - allowing a user to select at least one folder;
   - saving data in a first file having a file name in one selected folder;
   - in each of the other selected folders, creating a shortcut file having a different file name from the first file and containing a pointer to the first file;
   - creating a hidden file in the folder containing the first file, the hidden file containing a list of pointers to the shortcut files; and
   - using the hidden file during file management operations to keep track of occurrences of the shortcut files in the file hierarchy,
   - wherein a file may be opened and modified, the opening including:
   - entering a command from an application to open a file;
   - displaying the file hierarchy and selecting one of the at least one folder;
   - selecting a file having a different name from the first file;
   - if the file to be opened is not a shortcut file, opening the first file; and
   - if the file to be opened is a shortcut file, pointing to and opening the first file;
   - and wherein, if the opened file is modified, a modified version of the opened file may be saved in one of two ways according to the user's preference,
   - a first method including saving the modified version of the opened file in the opened file, regardless of whether the opened file was opened via the opened file or one of the at least one shortcut files pointing to the opened file, and
   - a second method including saving the modified version of the opened file to at least one, but not all of, the at least one shortcuts, according to the user's selection.

2. The method of claim 1 further comprising the steps of:
   - entering a command from an application to delete a file;
   - displaying the file hierarchy and selecting one of the at least one folder;
   - selecting the file having a file name;
   - if a hidden file does not exist, deleting the file;
   - if a hidden file exists and if the selected file is a shortcut file, deleting the shortcut file and updating the hidden file accordingly; and
   - if a hidden file exists and if the selected file is not a shortcut file, replacing one of the shortcut files by the selected file, updating the hidden file accordingly, and moving the hidden file into the folder of the replaced shortcut file and deleting the selected file.

3. The method of claim 2 further comprising the steps of: if a hidden file exists:
   - displaying a button to delete the selected file from all folders containing the file or a shortcut file to the selected file; and
   - if the button is selected, deleting the selected file and all the other shortcut files or non-shortcut file and belonging to other folders.

4. The method of claim 1 further comprising the steps of:
   - entering a command from an application to move a file;
   - displaying the file hierarchy and selecting one of the at least one folder;
   - selecting a file having a different file name;
   - selecting a target folder;
   - if a hidden file does not exist, moving the selected file;
   - if a hidden file exists and if the selected file is a shortcut file, moving the shortcut file and updating the hidden file accordingly; and
   - if a hidden file exists and if the selected file is not a shortcut file, moving the file to the target folder, updating the hidden file accordingly, and moving the hidden file to the target folder.

5. The method of claim 1 further comprising the steps of:
   - entering a command from an application to copy a file;
   - displaying the file hierarchy and selecting one of the at least one folder;
   - selecting a file having the file name;
   - selecting a target folder;
   - if a hidden file does not exist, copying the selected file; and
   - if a hidden file exists, creating in the target folder a short cut file of the selected file and updating the hidden file accordingly.

* * * * *